United States Patent
Jeong et al.

(10) Patent No.: US 10,375,691 B2
(45) Date of Patent: Aug. 6, 2019

(54) METHOD FOR MANAGING WIRELESS RESOURCES, AND ACCESS POINT USING SAME

(71) Applicant: KT CORPORATION, Gyeonggi-do (KR)

(72) Inventors: Yang-Seok Jeong, Gyeonggi-do (KR); Young-Keum Song, Seoul (KR); Jong-Hwa Shin, Seoul (KR); Mi-Ji Choi, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 6 days.

(21) Appl. No.: 15/543,953

(22) PCT Filed: Jan. 13, 2016

(86) PCT No.: PCT/KR2016/000357
§ 371 (c)(1),
(2) Date: Jul. 14, 2017

(87) PCT Pub. No.: WO2016/114588
PCT Pub. Date: Jul. 21, 2016

(65) Prior Publication Data
US 2018/0027552 A1    Jan. 25, 2018

(30) Foreign Application Priority Data
Jan. 16, 2015   (KR) .................. 10-2015-0008176

(51) Int. Cl.
*H04W 72/04*   (2009.01)
*H04W 72/08*   (2009.01)
(Continued)

(52) U.S. Cl.
CPC ....... *H04W 72/0446* (2013.01); *H04W 24/00* (2013.01); *H04W 24/02* (2013.01);
(Continued)

(58) Field of Classification Search
None
See application file for complete search history.

(56) References Cited

U.S. PATENT DOCUMENTS

2004/0264394 A1* 12/2004 Ginzburg ............... H04L 29/06
                                                               370/310
2005/0153667 A1   7/2005 Cave et al.
(Continued)

FOREIGN PATENT DOCUMENTS

EP         2696638 A1    2/2014
WO     2006/026679 A1    3/2006
(Continued)

OTHER PUBLICATIONS

George Athanasiou et al., "LAC: Load-Aware Channel Selection in 802.11 WLANs", Personal, Indoor and Mobile Radio Communications, PIMRC 2008. IEEE 19th International Symposium on, IEEE, Piscataway, NJ, USA, Sep. 15, 2008, pp. 1-6, XP031371782, ISBN: 978-1-4244-2643-0.

(Continued)

*Primary Examiner* — George C Atkins
(74) *Attorney, Agent, or Firm* — IP Legal Services, LLC (57) ABSTRACT

The present invention relates to a method for managing wireless resources, and an access point (AP) using the same. The method for managing wireless resources, according to one embodiment of the present invention, can comprise: a monitoring step of monitoring the use state of an operation channel being used, so as to determine the use state of the wireless resources for the operation channel; and a control step of changing, by the AP, the frequency of the operation channel or handing a terminal connected to the AP over to a neighboring AP according to the determined use state of the wireless resources.

16 Claims, 6 Drawing Sheets

(51) Int. Cl.
- *H04W 24/00* (2009.01)
- *H04W 74/08* (2009.01)
- *H04W 24/02* (2009.01)
- *H04L 29/06* (2006.01)
- *H04W 88/08* (2009.01)
- *H04W 36/06* (2009.01)
- *H04W 36/08* (2009.01)
- *H04W 36/22* (2009.01)
- *H04W 84/12* (2009.01)

(52) U.S. Cl.
CPC ....... *H04W 72/04* (2013.01); *H04W 72/0486* (2013.01); *H04W 72/082* (2013.01); *H04W 72/085* (2013.01); *H04W 74/08* (2013.01); *H04L 69/22* (2013.01); *H04W 36/06* (2013.01); *H04W 36/08* (2013.01); *H04W 36/22* (2013.01); *H04W 84/12* (2013.01); *H04W 88/08* (2013.01)

(56) References Cited

U.S. PATENT DOCUMENTS

| | | |
|---|---|---|
| 2006/0072502 A1 | 4/2006 | Crandall et al. |
| 2006/0189322 A1* | 8/2006 | Conte ............... H04W 72/0406 455/453 |
| 2011/0039564 A1* | 2/2011 | Johnstone ............. H04W 36/22 455/436 |
| 2011/0292884 A1 | 12/2011 | Li et al. |
| 2011/0307609 A1 | 12/2011 | Rangarajan et al. |
| 2012/0304213 A1 | 11/2012 | Lee et al. |
| 2013/0022013 A1 | 1/2013 | Jo et al. |
| 2013/0035125 A1 | 2/2013 | Lee et al. |
| 2013/0039315 A1 | 2/2013 | Jo et al. |
| 2013/0040683 A1* | 2/2013 | Siomina ............ H04W 28/0236 455/517 |
| 2013/0054723 A1 | 2/2013 | Jo et al. |
| 2013/0117402 A1 | 5/2013 | Jo et al. |
| 2013/0155995 A1 | 6/2013 | Jo et al. |
| 2013/0155998 A1 | 6/2013 | Jo et al. |
| 2013/0157681 A1 | 6/2013 | Jo et al. |
| 2013/0157706 A1 | 6/2013 | Jo et al. |
| 2014/0369217 A1 | 12/2014 | Kim et al. |
| 2015/0208330 A1 | 7/2015 | Park et al. |
| 2015/0230093 A1 | 8/2015 | Park et al. |
| 2016/0014665 A1* | 1/2016 | Centonza ............. H04W 28/08 455/436 |
| 2016/0205615 A1 | 7/2016 | Seok |
| 2017/0164406 A1* | 6/2017 | Son ....................... H04W 74/08 |

FOREIGN PATENT DOCUMENTS

| | | |
|---|---|---|
| WO | 2011/122860 A2 | 10/2011 |
| WO | 2012/057569 A2 | 5/2012 |
| WO | 2014/042437 A2 | 3/2014 |
| WO | 2014/088175 A1 | 6/2014 |

OTHER PUBLICATIONS

John (Ju-Hyung) Son et al., "Further Considerations on Enhanced CCA for 11ax", Wilus Institute, IEEE 802.11-1410847r1, Jul. 15, 2014, pp. 1-12, XP068069563.

* cited by examiner

METHOD FOR MANAGING WIRELESS RESOURCES, AND ACCESS POINT USING SAME

CROSS REFERENCE TO RELATED APPLICATIONS

This application is a National Stage Patent Application of PCT International Patent Application No. PCT/KR2016/000357 (filed on Jan. 13, 2016) under 35 U.S.C. § 371, which claims priority to Korean Patent Application No. 10-2015-0008176 (filed on Jan. 16, 2015), the teachings of which are incorporated herein in their entireties by reference.

TECHNICAL FIELD

The present disclosure relates to a method for managing wireless resources and access point using the same, and more particularity, to a wireless resource management method for efficiently managing wireless resources used in a wireless local area network (WLAN) system and access point using the same.

BACKGROUND ART

A wireless local area network (WLAN) basically supports Access Point (AP) acting as the point of access in a Distributed System (DS) and Basic Service Set (BSS) composed of multiple wireless stations (STAs), not APs.

Generally, AP provides a service with a specific wireless channel in unlicensed frequency bands set as an operation channel. Thus, each AP may arbitrarily set operation channels, and adjacent APs may work on the overlapping operation channel having the same frequency. This is referred to as overlapping basic service set (OBSS), and in OBSS environment, APs and STAs contend for the same wireless channel resource. In this case, if a certain AP occupies too much wireless resources, other APs experience a lack of wireless resources, failing to efficiently manage wireless resources.

Meanwhile, even when adjacent APs have different operation channels, a certain AP may have a concentration of many STAs, while a smaller number of STAs may be connected to nearby APs. In this instance, the AP having a concentration of STAs experiences a lack of wireless resources, resulting in reduced processing rate or WLAN service quality degradation, whereas wireless resources are not used by the nearby APs that can provide the same WLAN service, causing an inefficient management problem.

DISCLOSURE

Technical Problem

The present disclosure is directed to providing a wireless resource management method for efficiently managing wireless resources used in a wireless local area network (WLAN) system and access point using the same.

Technical Solution

A method for managing wireless resources according to an embodiment of the present disclosure includes a monitoring step of monitoring, by access point (AP), a utilization status of an operation channel being used to determine a wireless resource utilization state of the operation channel, and a control step of changing, by the AP, frequency of the operation channel or handing over station connected to the AP to a nearby AP, based on the determined wireless resource utilization state.

Here, the monitoring step may include generating a wireless resource utilization distribution matrix of the operation channel based on a result of the monitoring.

Here, the monitoring step may include generating the wireless resource utilization distribution matrix containing separately a busy time during which the operation channel is occupied and used, and an idle time during which the operation channel is unoccupied and stays idle waiting.

Here, the busy time may include an interference time during which a non-WLAN signal or an interfering signal occupies the operation channel, an overlapping load time during which the nearby AP occupies the operation channel, and a self-load time during which the AP occupies the operation channel.

Here, the monitoring step may include categorizing a time during which a signal impossible to decode is inputted via the operation channel as the interference time.

Here, the monitoring step may include, when the signal impossible to decode is inputted, performing energy detection on the operation channel, and measuring a time during which detection of energy higher than or equal to a preset energy limit in the operation channel continues as the interference time.

Here, the monitoring step may include calculating the overlapping load time or the self-load time by summing up a time during which the operation channel is occupied by the signal, when it is possible to decode the signal inputted via the operation channel.

Here, the monitoring step may include identifying the time during which the operation channel is occupied by the signal using a duration value stored in a duration field included in a header region of a Medium Access control (MAC) frame included in the signal.

Here, the monitoring step may include calculating the overlapping load time by summing up a duration value included in a signal with a transmitter address or a receiver address included in the decoded MAC header mismatching an address of the station connected to the AP, and calculating the self-load time by summing up a duration value included in a signal with a transmitter address or a receiver address included in the decoded MAC header matching an address of the station connected to the AP.

Here, the monitoring step may include generating the wireless resource utilization distribution matrix by calculating an interference ratio of the interference time to total monitoring time, an overlapping load ratio of the overlapping load time to total monitoring time, and a load ratio of the self-load time to total monitoring time.

Here, the control step may include, when the interference ratio exceeds a preset excessive interference ratio, determining it as excessive interference and changing the operation channel of the AP.

Here, the control step may include, when the overlapping load ratio exceeds a preset overlapping ratio limit, determining it as excessive overlapping load, and changing the operation channel of the AP.

Here, the control step may include, when the load ratio exceeds a preset load ratio limit, determining it as excessive self-load, and handing over stations connected to the AP point to the nearby AP.

The AP according to an embodiment of the present disclosure includes a monitoring unit configure to monitor a utilization status of an operation channel to determine a wireless resource utilization state of the operation channel, and a control unit configured to change the operation channel or hand over a connected station to a nearby AP based on the determined wireless resource utilization state.

In addition, the above technical problem-solving methods do not enumerate all the features of the present disclosure. Various features of the present disclosure and resulting advantages and effects will be understood in greater detail with reference to the following specific embodiments.

Advantageous Effects

According to the method for managing wireless resources in accordance with an embodiment of the present disclosure and access point using the same, it is possible to efficiently manage wireless resources used in a wireless local area network (WLAN) system.

According to the method for managing wireless resources in accordance with an embodiment of the present disclosure and access point using the same, it is possible to monitor the wireless resource utilization status of channels used in a WLAN system as a quantitative indicator.

According to the method for managing wireless resources in accordance with an embodiment of the present disclosure and access point using the same, it is possible to prevent wireless resources such as operation channels of access points from being excessively occupied by signals transmitted from non-WLAN devices or signals from overlapping another access point.

According to the method for managing wireless resources in accordance with an embodiment of the present disclosure and access point using the same, it is possible to determine whether stations concentrate on a specific access point in a WLAN system, and in the event of concentration of stations, to distribute loads to nearby access points.

MODE FOR CARRYING OUT THE INVENTION

Hereinafter, preferred embodiments are described in a manner sufficiently clear and complete for them to be easily carried out by those having ordinary skill in the technical field to which the invention belongs, by referring to the accompanying drawings. Rather, in describing the preferred embodiments of the present disclosure in detail, when detailed descriptions of related known functions or elements are deemed to render the essence of the present disclosure ambiguous, their detailed descriptions are omitted herein. Furthermore, parts having similar functions and operation will be indicated by the same symbol throughout the drawings.

In addition, throughout the specification, it will be understood that when an element is referred to as being 'connected' to another element, it can be directly connected to the other element or intervening elements may be present. In contrast, when an element is referred to as being 'directly connected' to another element, there are no intervening elements present. It will be further understood that the terms 'comprises', 'comprising', 'includes' and/or 'including' as used herein specify the presence of stated elements, but do not preclude the presence or addition of one or more other elements.

Figure 1:
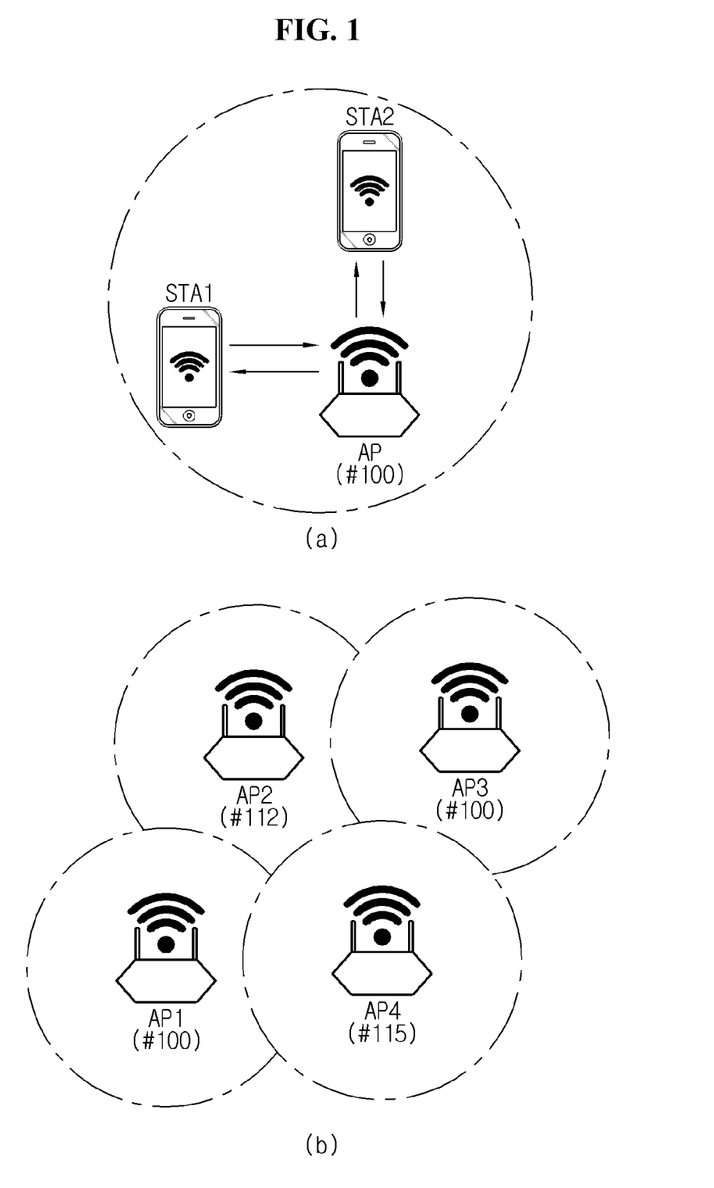
FIGS. 1 and 2 are schematic diagrams showing a wireless local area network (WLAN) system including access point according to an embodiment of the present disclosure.
Figure 2:
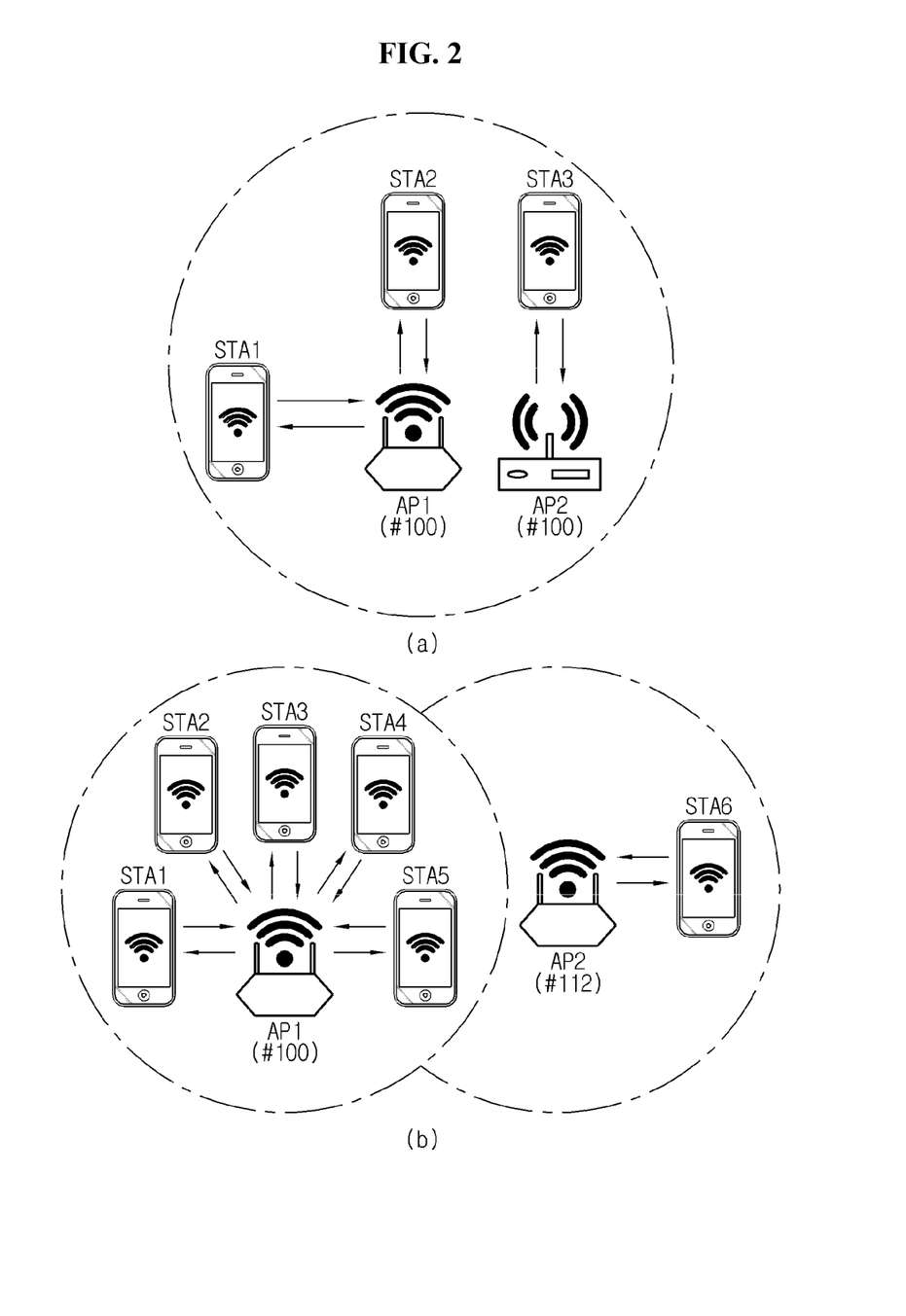

FIGS. 1 and 2 are schematic diagrams showing a wireless local area network (WLAN) system including access point (AP) according to an embodiment of the present disclosure.

As shown in FIG. 1(*a*), the WLAN system forms a basic service set (BSS) in infrastructure mode enabling the wireless interconnection of an AP and stations (STAs), and can provide a local network service. Here, AP can provide a service using a specific wireless channel in a service unlicensed frequency band set as an operation channel #100. Thus, as in FIG. 1(*b*), to provide a wireless local network service over a wide area using multiple APs AP1, AP2, AP3, AP4, there is a need to set each AP to use different operation channels #100, #112, #150. That is, the wireless channel capacity can be maximized by setting the operation channels between adjacent APs to different frequencies.

Because operation channels can be arbitrarily set, adjacent APs AP1, AP2 may work on the overlapping operation channel #100 having the same frequency as shown in FIG. 2(*a*). This is referred to as overlapping basic service set (OBSS), and in OBSS environment, AP1, AP2 and STA1, STA2, STA3 contend for the same wireless channel resource. In this case, if a certain access point AP1, AP2 occupies too much wireless resources, the other access point experiences a lack of wireless resources, failing to efficiently manage wireless resources.

Furthermore, as in FIG. 2(*b*), even when adjacent access points AP1, AP2 have different operation channels #100, #112, a certain access point AP1 may have a concentration of many stations STA1, STA2, STA3, STA4, STA5, while a smaller number of stations STA6 may be connected to a nearby access point AP2. In this instance, due to a lack of wireless resources, AP1 having a concentration of stations has a reduction in processing rate or WLAN service quality degradation, whereas wireless resources are not used by the nearby access point AP2 that can provide the same WLAN service, causing an inefficient management problem.

Figure 4:
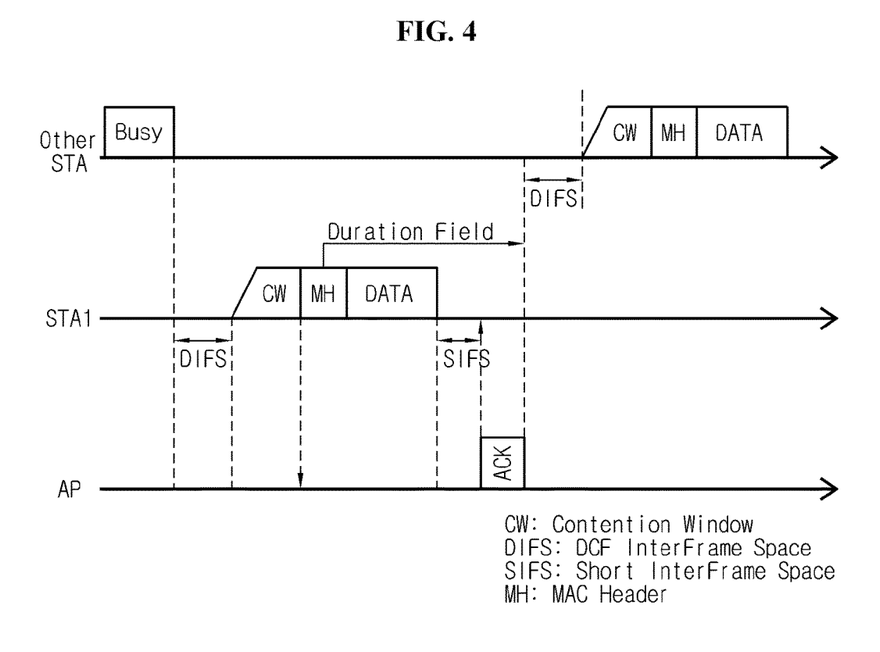
FIG. 4 is a timing diagram showing data frame transmission between access point and station according to an embodiment of the present disclosure.

Meanwhile, in relation to a data transmission method in the WLAN system, as shown in FIG. 4, STA1 may transmit a data frame to AP, and AP may transmit an ACK frame to STA1 to notify that it has received the corresponding data frame normally. Specifically, before transmitting data, STA1 may identify whether an operation channel is busy or idle during DCF InterFrame Space (DIFS). That is, when Distributed Coordinate Function (DCF) is used as a channel access mechanism in the WLAN system, it is required to identify the state of the channel during DIFS before transmitting a data frame or a management frame. Subsequently, when STA1 transmits a data frame through the operation channel, AP may identify the state of the channel during Short InterFrame Space (SIFS), and transmit a control frame such as an Acknowledge (ACK) frame and a Clear To Send (CTS) frame in response to the received data frame. According to embodiments, to support Quality of Service (QoS), DIFS may be replaced by Arbitration InterFrame Space (AIFS) having a variable length based on the type of data traffic.

That is, when energy higher than or equal to a preset energy limit is sensed in the operation channel during DIFS or SIFS, STA1 or AP determines that the operation channel is in busy state, and waits for the release from the busy state. Later, when the operation channel is released from the busy state, it identifies the state of the operation channel during DIFS, and to prevent collisions caused by simultaneous transmissions from other STA, it performs backoff during Contention Window (CW) prior to transmission. Here, although the case in which STA1 transmits data to AP is taken as an example, the same method may be used in the case in which AP transmits data to STA1.

Additionally, to prevent transmission collisions between data frames and needing to stay awake and wait while other STA is transmitting data, each of STA and AP may use a Network Allocation Vector (NAV) timer. That is, a header region of a Medium Access Control (MAC) frame transmitted with a data frame contains information of the corresponding data frame including a transmitter address and a receiver address and a duration field representing the time to be protected to complete transmission. Thus, other STA or AP sets an expiry time of each NAV timer to determine the time to attempt to access the operation channel, by referring to the duration field from the header of the MAC frame that was received via the operation channel and decoded normally. Here, the duration stored in the duration field may be set based on the length of the data frame to transmit, SIFS and the length of an ACK frame, and the expiry time of the NAV timer may be set as an expiry time of the ACK frame. Accordingly, STA or AP does not need to always identify whether the operation channel is busy or idle to transmit a data frame, and wakes up and attempts to access the channel each time the set NAV timer expires.

Hereinafter, by referring to the data transmission method in the WLAN system described above, AP according to an embodiment of the present disclosure capable of solving the inefficient wireless resource utilization problem in the WLAN system is described.

Figure 3:
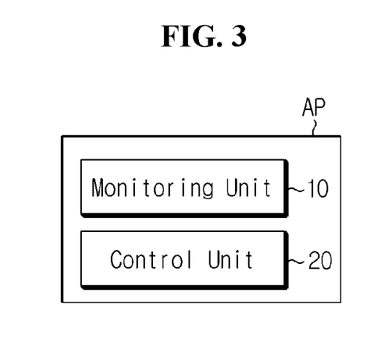
FIG. 3 is a block diagram showing access point according to an embodiment of the present disclosure.

FIG. 3 is a block diagram showing AP according to an embodiment of the present disclosure.

Referring to FIG. 3, the AP according to an embodiment of the present disclosure includes a monitoring unit 10 and a control unit 20. The monitoring unit 10 and the control unit 20 may be implemented as a combination of hardware and/or software. Furthermore, the AP may include memory and at least one processor, and functions of the monitoring unit 10 and the control unit 20 as described below may be implemented in the AP in the form of a program that is stored in the memory and executed by the at least one processor.

The monitoring unit 10 may monitor the utilization status of the operation channel used by AP during a preset monitoring time, and determine the wireless resource utilization state of the operation channel based on the monitoring results.

Figure 5:
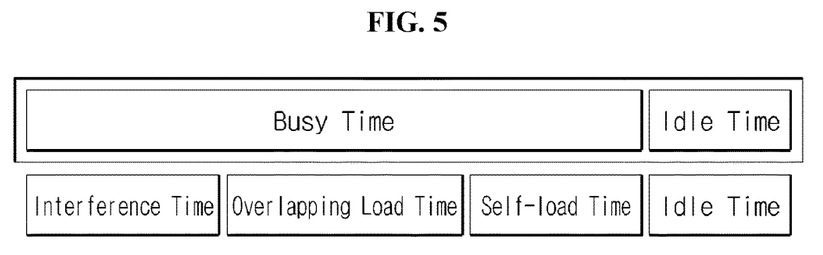
FIG. 5 is a schematic diagram showing a wireless resource utilization distribution matrix according to an embodiment of the present disclosure.

Specifically, the monitoring unit 10 may generate a wireless resource utilization distribution matrix of the operation channel based on the monitoring results. That is, as shown in FIG. 5, the wireless resource utilization distribution matrix may represent a busy time and an idle time. Here, the busy time is the time during which the operation channel is occupied by a signal having energy higher than or equal to a preset energy limit, and the idle time corresponds to the time during which the operation channel is not occupied by a signal having energy higher than or equal to the preset energy limit and stays idle waiting. Here, the busy time may be categorized into an interference time, an overlapping load time, and a self-load time. The interference time refers to the time during which the operation channel is occupied by a non-WLAN signal or an interfering signal, and the overlapping load time refers to the time during which nearby AP occupies the operation channel. That is, the overlapping load time refers to the time during which the operation channel is occupied by nearby AP when AP uses the same operation channel as the nearby AP as shown in FIG. 2(a). Meanwhile, the self-load time refers to the time during which AP occupies the operation channel.

Here, the monitoring unit 10 may decode a signal inputted via the operation channel, and if the signal is impossible to decode, may determine the time during which the signal is inputted to be the interference time. That is, because the non-WLAN signal or interfering signal is impossible for AP to decode, when the signal impossible to decode is inputted, the operation channel may be determined to be occupied by the non-WLAN signal or interfering signal. In this instance, the monitoring unit 10 may perform energy detection on the operation channel, and may measure the time during which detection of energy higher than or equal to the preset energy limit continues and calculate the interference time. That is, the monitoring unit 10 may calculate the interference time by summing up the time during which detection of energy higher than or equal to the preset energy limit continues over the total monitoring time during which monitoring is performed. However, there is always a non-WLAN signal or interfering signal applied to the operation channel. Accordingly, only in the case in which the non-WLAN signal or interfering signal has levels higher than or equal to the preset energy limit, the operation channel is determined to be occupied by the non-WLAN signal or interfering signal and impossible to transmit another WLAND signal.

On the other hand, if the signal inputted via the operation channel is possible to decode, the monitoring unit 10 may determine that the operation channel is occupied by AP or nearby AP. Here, the transmitter address or receiver address included in the header region of the MAC frame included in the signal may be used to identify whether the operation channel is occupied by nearby AP or AP occupies the operation channel. That is, when the transmitter address or receiver address included in the decoded MAC header matches an address of STA connected to AP, AP may be determined to occupy the operation channel, and when the addresses mismatch, the operation channel may be determined to be occupied by nearby AP. Subsequently, the duration value stored in the duration field included in the header region of the MAC frame included in the signal may be used to identify the time during which the operation channel is occupied by the signal.

Accordingly, the monitoring unit 20 may calculate respectively the self-load time during which AP occupies the operation channel and the overlapping load time during which nearby AP occupies the operation channel, using the transmitter address or receiver address and the duration field of the signal. That is, the monitoring unit 20 may calculate the overlapping load time by summing up duration values included in signals with the transmitter address or receiver address included in the decoded MAC header mismatching the address of STA connected to AP. Furthermore, the monitoring unit 20 may calculate the self-load time by summing up duration values included in signals with the transmitter address or receiver address included in the decoded MAC header matching the address of STA connected to AP.

Additionally, the monitoring unit 10 may generate a wireless resource utilization distribution matrix by calculating respectively an interference ratio of the interference time to the total monitoring time, an overlapping load ratio of the overlapping load time to the total monitoring time, and a load ratio of the self-load time to the total monitoring time. That is, the monitoring unit 10 may generate the wireless resource utilization distribution matrix by applying proportions of the ratios. Meanwhile, the monitoring unit 10 may periodically calculate each corresponding interference time, overlapping load time, and self-load time in the total monitoring time.

The control unit 20 may change the operation channel or hand over the connected STA to nearby AP, based on the determined wireless resource utilization state. That is, the control unit 20 may distribute wireless resources based on the monitoring results, to achieve efficient wireless resource management.

Specifically, when the interference ratio measured by the monitoring unit 10 exceeds a preset excessive interference ratio, the control unit 20 may determine that the operation channel has too much interference, and to resolve the excessive interference, allow AP to change the operation channel. That is, because the operation channel being used is excessively influenced by the non-WLAN signal or interfering signal, AP is allowed to use an operation channel of another frequency, to resolve the excessive interference.

Furthermore, the control unit 20 may determine whether the overlapping load ratio measured by the monitoring unit 10 exceeds a preset overlapping ratio limit, and when the overlapping load ratio exceeds the preset overlapping ratio limit, may determine it as excessive overlapping load. That is, when the overlapping load ratio exceeds the overlapping ratio limit, AP may be deficient in wireless resource utilization due to nearby AP excessively occupying the operation channel. Accordingly, when it is determined as excessive overlapping load, the control unit 20 may allow AP to change the operation channel to avoid OBSS environment.

As described in the foregoing, when changing the operation channel, the control unit 20 may receive a wireless resource distribution matrix of another operation channel from the monitoring unit 10 beforehand. Subsequently, the control unit 20 may set an operation channel to change based on the received wireless resource distribution matrix of another channel. For example, in the case of excessive interference, the control unit 20 may select a channel having a relatively low interference ratio and change the operation channel to the selected channel, and in the case of excessive overlapping load, the control unit 20 may select a channel having a relatively low overlapping load ratio and change the operation channel to the selected channel.

Additionally, the control unit 20 may identify whether the load ratio measured by the monitoring unit 10 exceeds a preset load ratio limit, and when the measured load ratio exceeds the preset load ratio limit, may determine it as excessive self-load. That is, AP having a concentration of stations may fail to exert its normal performance or may have a risk of WLAN service quality degradation. Accordingly, to resolve the excessive self-load of AP, the control unit 20 may hand over STAs connected to AP to nearby APs. That is, the control unit 20 may distribute the load of AP to other nearby APs.

Figure 6:
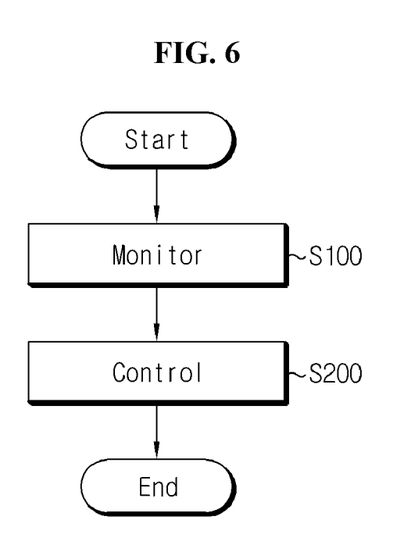
FIG. 6 is a flowchart showing a method for managing wireless resources according to an embodiment of the present disclosure.

FIG. 6 is a flowchart showing a method for managing wireless resources according to an embodiment of the present disclosure.

Referring to FIG. 6, the method for managing wireless resources according to an embodiment of the present disclosure includes a monitoring step S100 and a control step S200.

Hereinafter, the method for managing wireless resources according to an embodiment of the present disclosure is described with reference to FIG. 6.

At the monitoring step S100, AP may monitor the utilization status of an operation channel being used, and determine the wireless resource utilization state of the operation channel based on the monitoring results.

Specifically, at the monitoring step S100, a wireless resource utilization distribution matrix of the operation channel may be generated based on the monitoring results. Here, the wireless resource utilization distribution matrix may represent a busy time and an idle time, and the busy time may be the time during which the operation channel is occupied and used, and the idle time may be the time during which the operation channel is not occupied and stays idle waiting. The busy time may include an interference time, an overlapping load time and a self-load time, and the interference time may refer to the time during which the operation channel is occupied by a non-WLAN signal or an interfering signal, and the overlapping load time may refer to the time during which nearby AP occupies the operation channel. Furthermore, the self-load time may refer to the time during which AP occupies the operation channel.

Meanwhile, at the monitoring step S100, decoding of a signal inputted via the operation channel may be performed first, and if the signal is impossible to decode, the time during which the signal is inputted may be determined to be the interference time. That is, because the non-WLAN signal or interfering signal is impossible for AP to decode, when the signal impossible to decode is inputted, the operation channel may be determined to be occupied by the non-WLAN signal or interfering signal. Accordingly, at the monitoring step S100, the interference time may be calculated by summing up the time during which detection of energy higher than or equal to a preset energy limit continues over the total monitoring time during which monitoring is performed. Generally, because there is always a non-WLAN signal or interfering signal applied to the operation channel, only in the case in which the non-WLAN signal or interfering signal has levels higher than or equal to the preset energy limit, it may be determined that the non-WLAN signal or interfering signal occupies the operation channel.

In contrast, at the monitoring step S100, if the signal inputted via the operation channel is possible to decode, the operation channel may be determined to be occupied by AP or nearby AP. Here, using a transmitter address or a receiver address included in a header region of a MAC frame included in the signal, it is possible to determine whether the operation channel is occupied by nearby AP or whether AP occupies the operation channel. That is, when the transmitter address or receiver address included in the decoded MAC header matches an address of a station connected to AP, the operation channel may be determined to be occupied by AP, and when the addresses mismatch, the operation channel may be determined to be occupied by nearby AP. Subsequently, using a duration value stored in a duration field included in the header region of the MAC frame included in the signal, it is possible to identify the time during which the operation channel is occupied by the signal.

Accordingly, at the monitoring step S100, the overlapping load time may be calculated by summing up duration values included in signals with the transmitter address or receiver address included in the decoded MAC header mismatching the address of the station connected to AP, and the self-load time may be calculated by summing up duration values included in signals with the transmitter address or receiver address included in the decoded MAC header matching the address of the station connected to AP.

Additionally, at the monitoring step S100, the wireless resource occupancy distribution matrix may be generated by calculating respectively an interference ratio of the interference time to the total monitoring time, an overlapping load ratio of the overlapping load time to the total monitoring time, and a load ratio of the self-load time to the total monitoring time. That is, the wireless resource occupancy distribution matrix may be generated by applying proportions of the ratios. Meanwhile, at the monitoring step S100, each corresponding interference time, overlapping load time, and self-load time in the total monitoring time may be calculated repeatedly at a preset cycle.

At the control step S200, AP may change the frequency of the operation channel or hand over the station connected to AP to nearby AP, based on the determined wireless resource utilization state. That is, at the control step S200, wireless resources may be distributed based on the monitoring results, to achieve efficient wireless resource management.

Specifically, at the control step S200, when the measured interference ratio exceeds a preset excessive interference ratio, the operation channel may be determined to have too much interference, and to resolve the excessive interference, AP may be allowed to change the operation channel. That is, because there is the excessive influence of the non-WLAN signal or interfering signal on the operation channel being currently used by AP, AP is allowed to use an operation channel of another frequency, to resolve the excessive interference.

Furthermore, at the control step S200, whether the measured overlapping load ratio exceeds a preset overlapping ratio limit may be determined, and when the overlapping load ratio exceeds the preset overlapping ratio limit, it may be determined as excessive overlapping load. That is, when the overlapping load ratio exceeds an overlapping ratio limit, AP may be determined to be deficient in wireless resource utilization due to nearby AP excessively occupying the operation channel. Accordingly, through the control step S200, AP is allowed to change the operation channel so that AP will be out of overlapping BSS environment.

Further, at the control step S200, whether the measured load ratio exceeds a preset load ratio limit may be determined, and when the load ratio exceeds the preset load ratio limit, it may be determined as excessive self-load. That is, as AP has a concentration of stations, AP may be found to fail to exert its normal performance or have a risk that the quality of WLAN service to offer will be degraded. Accordingly, at the control step S200, to resolve the excessive self-load of AP, stations connected to AP may be handed over to nearby APs to distribute the load of AP to other nearby APs.

The present disclosure is not limited by the aforementioned embodiments and the accompanying drawings. It will be obvious to those having ordinary skill in the technical field to which the present disclosure belongs that substitution, modifications, and changes would be made to the components of the present disclosure without departing from the technical concept of the present disclosure.

What is claimed is:

1. A method for managing wireless resources, comprising:
    a monitoring step of monitoring, by an access point, a utilization status of an operation channel being used, to determine a wireless resource utilization state of the operation channel, the monitoring step further comprising:
    generating a wireless resource utilization distribution matrix of the operation channel based on a result of the monitoring;
    generating the wireless resource utilization distribution matrix containing one of a busy time at which the operation channel is occupied and used and an idle time at which the operation channel is unoccupied and stays idle waiting, and wherein the busy time comprises at least one of an interference time during which a non-Wireless Local Area Network (WLAN) signal or an interfering signal occupies the operation channel, an overlapping load time during which the nearby access point occupies the operation channel, and a self-load time during which the access point occupies the operation channel;
    calculating the overlapping load time or the self-load time by summing up a time during which the operation channel is occupied by the signal, when it is possible to decode the signal inputted via the operation channel, and
    identifying the time during which the operation channel is occupied by the signal using a duration value stored in a duration field included in a header region of a Medium Access control (MAC) frame included in the signal;
    and
    a control step of changing, by the access point, frequency of the operation channel or handing over a station connected to the access point to a nearby access point, based on the determined wireless resource utilization state.

2. The method for managing wireless resources according to claim 1, wherein the monitoring step comprises categorizing a time during which a signal impossible to decode is inputted via the operation channel as the interference time.

3. The method for managing wireless resources according to claim 2, wherein the monitoring step comprises, when the signal impossible to decode is inputted, performing energy detection on the operation channel, and measuring a time during which detection of energy higher than or equal to a preset energy limit in the operation channel continues as the interference time.

4. The method for managing wireless resources according to claim 1, wherein the monitoring step comprises:
    calculating the overlapping load time by summing up a duration value included in a signal with a transmitter address or a receiver address included in the decoded MAC header mismatching an address of the station connected to the access point; and
    calculating the self-load time by summing up a duration value included in a signal with a transmitter address or a receiver address included in the decoded MAC header matching an address of the station connected to the access point.

5. The method for managing wireless resources according to claim 1, wherein the monitoring step comprises generating the wireless resource utilization distribution matrix by calculating an interference ratio of the interference time to total monitoring time, an overlapping load ratio of the overlapping load time to total monitoring time, and a load ratio of the self-load time to total monitoring time.

6. The method for managing wireless resources according to claim 5, wherein the control step comprises, when the interference ratio exceeds a preset excessive interference ratio, determining it as excessive interference and changing the operation channel of the access point.

7. The method for managing wireless resources according to claim 5, wherein the control step comprises, when the overlapping load ratio exceeds a preset overlapping ratio limit, determining it as excessive overlapping load, and changing the operation channel of the access point.

8. The method for managing wireless resources according to claim 5, wherein the control step comprises, when the load ratio exceeds a preset load ratio limit, determining it as excessive self-load, and handing over stations connected to the access point to the nearby access point.

9. An access point comprising:
a monitoring unit configured to monitor a utilization status of an operation channel to determine a wireless resource utilization state of the operation channel, the monitoring unit further configured to:
generate a wireless resource utilization distribution matrix of the operation channel based on a result of the monitoring;
generate the wireless resource utilization distribution matrix containing one of a busy time at which the operation channel is occupied and used and an idle time at which the operation channel is unoccupied and stays idle waiting, and wherein the busy time comprises at least one of an interference time during which a non-Wireless Local Area Network (WLAN) signal or an interfering signal occupies the operation channel, an overlapping load time during which the nearby access point occupies the operation channel, and a self-load time during which the access point occupies the operation channel;
calculate the overlapping load time or the self-load time by summing up a time during which the operation channel is occupied by the signal, when it is possible to decode the signal inputted via the operation channel, and
identify the time during which the operation channel is occupied by the signal using a duration value stored in a duration field included in a header region of a Medium Access control (MAC) frame included in the signal; and
a control unit configured to change the operation channel or hand over a connected station to a nearby access point based on the determined wireless resource utilization state.

10. The access point of claim 9, wherein the monitoring unit is further configured to categorize a time during which a signal impossible to decode is inputted via the operation channel as the interference time.

11. The access point of claim 10, wherein when the signal impossible to decode is inputted, perform energy detection on the operation channel, and measure a time during which detection of energy higher than or equal to a preset energy limit in the operation channel continues as the interference time.

12. The access point of claim 9, wherein the monitoring unit is further configured to:
calculate the overlapping load time by summing up a duration value included in a signal with a transmitter address or a receiver address included in the decoded MAC header mismatching an address of the station connected to the access point; and
calculate the self-load time by summing up a duration value included in a signal with a transmitter address or a receiver address included in the decoded MAC header matching an address of the station connected to the access point.

13. The access point of claim 9, wherein the monitoring unit further configured to generate the wireless resource utilization distribution matrix by calculating an interference ratio of the interference time to total monitoring time, an overlapping load ratio of the overlapping load time to total monitoring time, and a load ratio of the self-load time to total monitoring time.

14. The access point of claim 13, wherein when the interference ratio exceeds a preset excessive interference ratio, the control unit is configured to determine it as excessive interference and changing the operation channel of the access point.

15. The access point of claim 13, wherein when the overlapping load ratio exceeds a preset overlapping ratio limit, the control unit determines it as excessive overlapping load, and changing the operation channel of the access point.

16. The access point of claim 13, wherein when the load ratio exceeds a preset load ratio limit, the control unit determines it as excessive self-load, and hands over stations connected to the access point to the nearby access point.

* * * * *